(12) United States Patent
Lachwani et al.

(10) Patent No.: US 8,452,995 B1
(45) Date of Patent: May 28, 2013

(54) UNIVERSAL SERIAL BUS LOW POWER IDLE MODE

(75) Inventors: Manish Lachwani, Sunnyvale, CA (US); Clifton Liu, Santa Clara, CA (US); Kenneth P. Kiraly, Menlo Park, CA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 720 days.

(21) Appl. No.: 12/648,557

(22) Filed: Dec. 29, 2009

(51) Int. Cl.
G06F 1/26 (2006.01)
(52) U.S. Cl.
USPC .......................................... 713/320

(58) Field of Classification Search
USPC ........................................ 713/324, 323, 320
See application file for complete search history.

(56) References Cited

U.S. PATENT DOCUMENTS 7,320,077 B2 * 1/2008 Kim ............................... 713/300
7,552,349 B2 * 6/2009 Hassan et al. ................. 713/320
7,577,765 B2 * 8/2009 Bhesania et al. ................ 710/10

* cited by examiner

Primary Examiner — Kim Huynh
Assistant Examiner — Austin Hicks
(74) Attorney, Agent, or Firm — Lee & Hayes, PLLC

(57) ABSTRACT

An idle universal serial bus ("USB") is placed into a low power mode. During low power mode, peripherals attached to the USB bus may also enter a low power mode. While in this low power mode, USB attached peripherals may retain some functionality. For example, a USB attached modem may remain connected, allowing rapid resumption of communications upon awakening.

24 Claims, 8 Drawing Sheets

FIG. 8A

GATE NOW UNUSED CLOCK(S)
706
- GATE USB HOST CONTROLLER CLOCK (E.G., USB_AHB_CLK) 802

FIG. 8B

GATE NOW UNUSED CLOCK(S)
706
- GATE USB HOST CONTROLLER CLOCK (E.G., USB_AHB_CLK) 802
- GATE EMI CLOCK (E.G., EMI_CLK) 804

FIG. 8C

GATE NOW UNUSED CLOCK(S)
706
- GATE USB HOST CONTROLLER CLOCK (E.G., USB_AHB_CLK) 802
- GATE EMI CLOCK (E.G., EMI_CLK) 804
- GATE USB PHASE-LOCKED LOOP (PLL) (E.G., USB_PLL) 806

FIG. 8D

GATE NOW UNUSED CLOCK(S)
706
- GATE USB HOST CONTROLLER CLOCK (E.G., USB_AHB_CLK) 802
- GATE USB PHASE-LOCKED LOOP (PLL) (E.G., USB_PLL) 806

UNIVERSAL SERIAL BUS LOW POWER IDLE MODE

BACKGROUND

Electronic devices such as electronic book reader devices ("eBook reader devices"), cellular telephones, portable media players, desktop computers, laptops, tablet computers, netbooks, personal digital assistants, and the like, rely on electrical power to function.

Within these electronic devices, several components utilize significant amounts of power during operation, including the processor(s) and peripheral devices. These peripherals include external memory interfaces (EMIs), Universal Serial Bus (USB) controllers, image processing units (IPUs), and so forth. These peripherals may reside on the same "chip" or die as the processor, on another die, or a combination of same die and another die.

A peripheral device that is not actively in use but idling continues to consume significant quantities of power and may prevent a central processor from entering a lower power mode. This idling wastes energy and increases the amount of heat dissipated by the electronic device. Reducing power consumption increases the usable time for a portable device operating from a battery. Reducing power consumption also reduces the heat dissipated by the electronic device, allowing it to operate at a cooler temperature and thus increasing the life of the equipment and simplifying the cooling design.

Various schemes have been put forth to reduce power consumption in portable consumer devices by placing the processor of the device and the peripherals into lower power modes. Typically, this involves turning off unused portions of the circuit and/or reducing clock speed of the microprocessor.

However, the techniques used to enter the lower power modes may introduce unacceptable latencies to execution of commands upon resumption of normal activity, particularly with regards to peripherals. Additionally, recurrent timer interrupts to query peripherals often prevent a device from entering a lower power mode, or from remaining in the lower power mode long enough to realize a meaningful reduction in power consumption.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 8A-8D are illustrative flow diagrams of processes for gating clocks when entering the USB low power idle mode.

DETAILED DESCRIPTION

Overview

Figure 1:
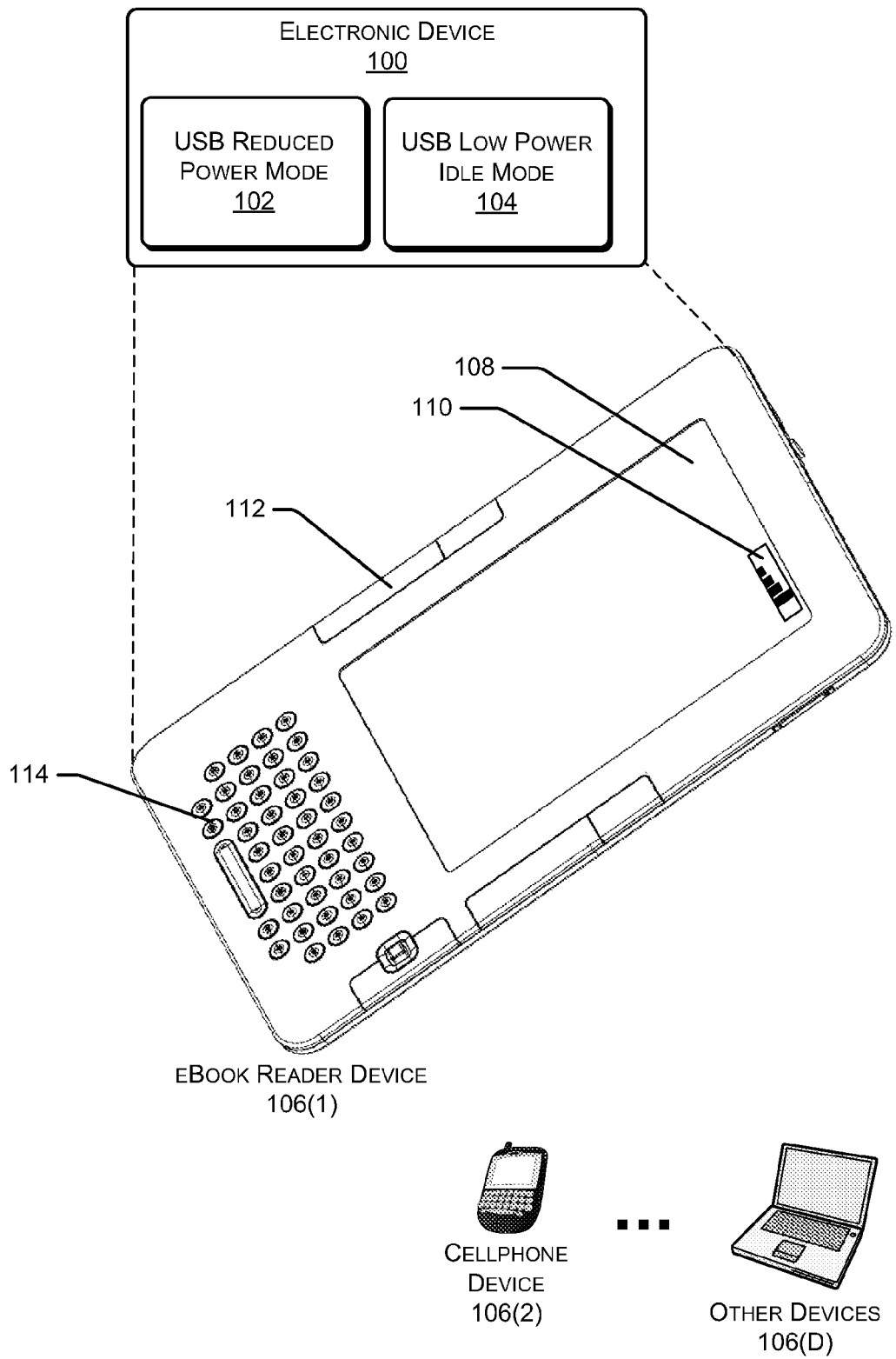
FIG. 1 is an illustrative eBook reader device configured to enter a universal serial bus ("USB") reduced power mode or a USB low power idle mode.

As described above, electronic devices utilize low power modes to reduce power consumption and heat dissipation. The electronic devices may be embodied as electronic book reader devices ("eBook reader devices"), cellular telephones, portable media players, desktop computers, laptops, tablet computers, netbooks, personal digital assistants, and the like. These devices may provide the ability to access content via a network connection. For example, an eBook reader device may have a wireless network connection to allow access to content stored elsewhere and accessible by the network connection. Reduction in energy requirements by devices is pursued, both to reduce overall energy usage, such as in desktops and servers, but also to extend the usable time of battery-powered devices such as eBook reader devices. One approach is to place the devices into a lower power mode.

Unfortunately, existing low power modes inadequately address operation of universal serial bus ("USB") controllers and associated peripherals. Even when low power modes are available in a device, these modes may remain underutilized due to recurrent timer interrupts from a USB controller preventing the device, or substantial portions of the device (e.g., a processor), from entering a low power mode or remaining in that mode for significant fractions of the time. Furthermore, existing low power modes prevent a communication peripheral, such as a wireless wide area networking ("WWAN") modem, on a USB from remaining connected while in the low power mode. As a result, existing low power modes lead to excessively long latencies when resuming WWAN communication. For example, previously when a peripheral such as a WWAN USB modem went into a low power mode, the network connection was lost. Upon re-awakening, the modem would then have to re-establish a connection which could take at least several seconds and sometimes minutes.

Thus, until now, users and electronic device designers faced a tradeoff: either keep a device awake to maintain a network connection and accept the high power consumption, or place a device to sleep to save power and accept long latencies upon re-establishing the network connection. Other USB attached peripherals, such as local area network interfaces, also faced similar tradeoffs.

Disclosed is method and system for placing a universal serial bus and USB controller into a reduced power mode as well as into a low power idle mode. While in these modes, the tradeoff described above is eliminated as power consumption is reduced while also retaining the ability to maintain a network connection.

These modes may be implemented by an electronic device utilizing a processor capable of gating clocks discretely. Gating is the ability to shutdown a selected portion or portions of a circuit. For example, the i.MX architecture from Freescale Semiconductor Incorporated, of Austin, Tex., United States of America, is one suitable family of processors. In this application, the reduction in power usage is relative to that of the electronic device in active operation, such as when accepting input, generating output, processing data, and so forth.

The processor executes an operating system, including, but not limited to, a Linux® operating system, a UNIX® operating system, Microsoft Corporation's Microsoft Windows® operating system, Microsoft Corporation's Windows Mobile® operating system, Apple Corporation's Mac OS® operating system, Apple Corporation's Mac OS X® operating system, and Wind River Systems Inc.'s VxWorks® operating system.

For example, an eBook reader device may incorporate a Freescale processor having an i.MX architecture and executing a Linux® kernel. The kernel uses device drivers to communicate with peripherals, such as external memory interfaces (EMIs), Universal Serial Bus (USB) controllers, image processing units (IPUs), and so forth. These peripherals may reside on the same "chip" or die as the processor, as in the case of the i.MX architecture, be on another die, or a combination of the same die and another die.

In communication with the kernel are the device drivers and daemons. The device drivers may include option drivers, host controller drivers, and so forth. Also in communication with the kernel are "daemons." Daemons are background processes configured to execute on a processor, generally without substantial input from a user. For example, a wide area networking daemon ("WAND") may be coupled to a WWAN modem to provide functionality of the WWAN modem to the kernel. These daemons may, but need not always, operate in user mode.

The WAND may periodically interrogate the modem at a pre-determined interrogation interval to determine modem status, such as availability of network service, signal strength, and so forth. The interrogation interval may be extended to that suitable for the operation at hand. For example, in an eBook reader device the interrogation interval may be set at about 40 seconds. While this reduces the frequency of updates such as the WWAN signal strength indicator presented to the user, this also reduces the number of USB interrupts. This reduction in the number of interrupts allows the device more time to enter and remain in a reduced power or low power mode. This reduction in time at full power may also extend the operational life of the device or subcomponents thereof.

The device may engage a USB reduced power mode or USB low power idle mode when no traffic is present on the universal serial bus (or "bus" hereinafter) for a pre-determined idle check interval. This pre-determined idle check interval may be dynamically or statically set. In one implementation, this pre-determined idle check interval may be set to at least about 500 milliseconds and at most about 31 seconds, with good performance at about three seconds.

While in USB reduced power mode or USB low power idle mode, the WWAN modem may maintain a network connection, which is available upon awakening. The entire device may, but need not necessarily, enter a doze mode. One such doze mode is discussed in pending U.S. patent application Ser. No. 12/261,980 filed Oct. 30, 2008 and entitled "Low Power Mode for Processor" with inventors Manish Lachwani and David Berbessou.

While this overview describes the reduced power and low power idle modes in terms of an eBook reader device, the concepts described herein may also be applicable to cellular telephones, portable media players, desktop computers, laptops, tablet computers, netbooks, servers, personal digital assistants, or other electronic devices.

Illustrative eBook Reader Device

FIG. 1 is an illustrative electronic device 100 configured to enter a USB reduced power mode 102 or a USB low power idle mode 104. Several devices are shown in this illustration which may utilize the USB reduced power mode 102, USB low power idle mode 104, or both. For example, eBook reader device 106(1) is shown embodied as a handheld, dedicated eBook reader device. Also shown are a cellphone device 106(2) and other devices 106(D) such as a netbook computer.

The eBook reader device 106(1) may have a display 108 to present content in a human-readable format to a user. In some implementations, one or more displays 108 may be present. The content presented on the display 108 may take the form of electronic books or "eBooks". For example, the display 108 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 108 may further include touch screen capabilities that allow user input through contact or gesturing relative to the display. For convenience only, the display 108 is shown in a generally rectangular configuration. However, it is understood that the display 108 may be implemented in any shape, and may have any ratio of height to width. Also, for stylistic or design purposes, the display 108 may be curved or otherwise non-linearly shaped. Furthermore display 108 may be flexible and configured to fold or roll.

A WWAN signal strength indicator 110, may also be presented on display 108. This signal strength indicator may be used to provide information to the user as to the availability of wireless network service. This availability may be presented as a bar graph or other representation indicating signal strength, connection speed, power consumption, or other attributes relating to the connection.

The eBook reader device 106(1) may also incorporate one or more actuable controls 112, and a keypad 114 for user input. The one or more actuatable controls 112 may have dedicated or assigned operations. For instance, the actuatable controls 112 may include page turning buttons, a joystick, navigational keys, a power on/off button, selection keys, joystick, touchpad, and so on.

While one embodiment of electronic device 100 is shown in relation to an eBook reader device, it is understood that electronic device may include cellular telephones 106(2), and other devices 106(D) such as portable media players, desktop computers, laptops, tablet computers, netbooks, personal digital assistants, servers, and the like.

Figure 2:
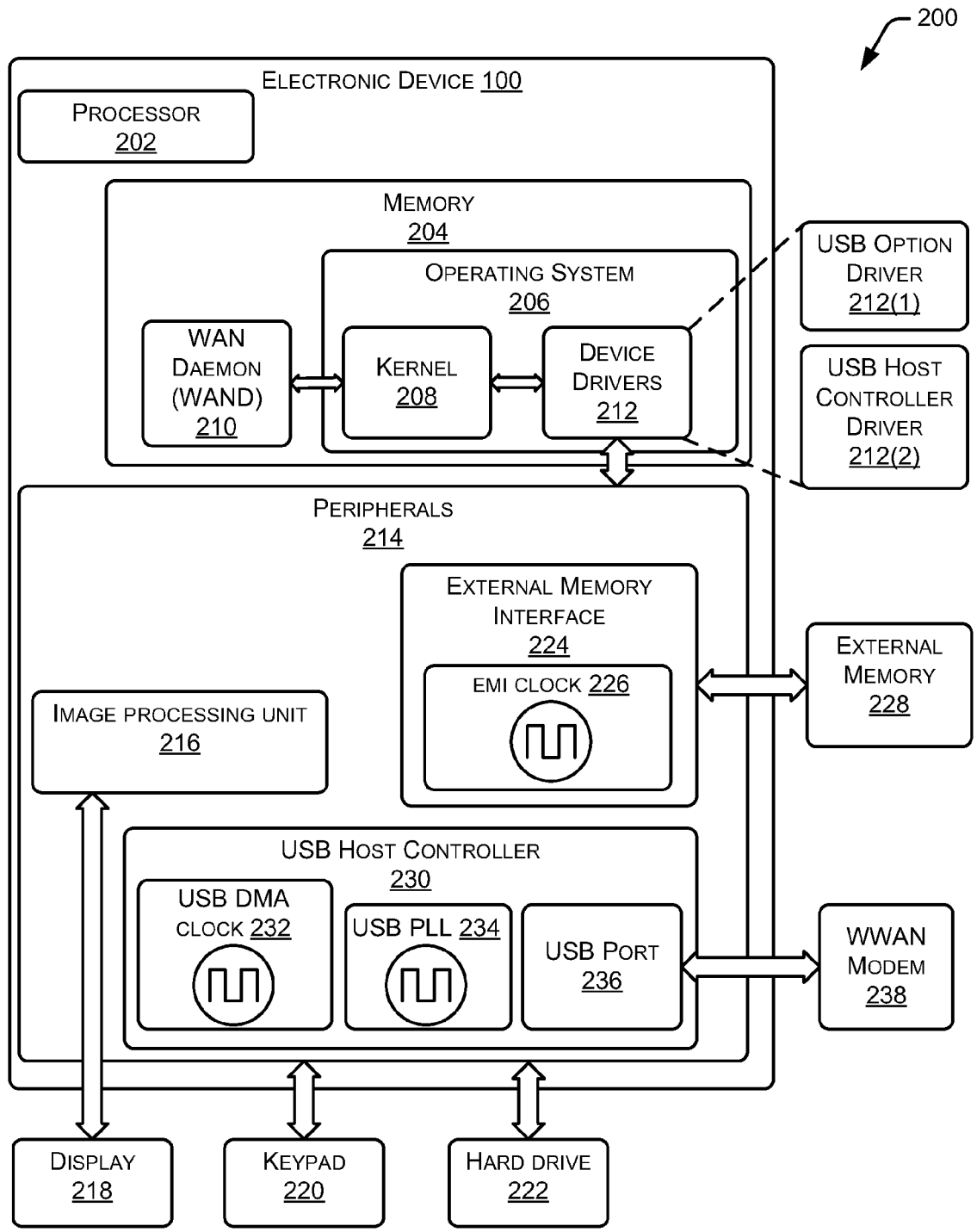
FIG. 2 is an illustrative schematic of an electronic device configured to enter the USB reduced power mode or the USB low power idle mode.

FIG. 2 illustrates selected functional components 200 that might be implemented with the electronic device 100. In a very basic configuration, the device 100 includes components such as a processor 202 composed of one or more processors and memory 204. Depending on the configuration of a device 100, the memory 204 may be an example of computer readable storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the device 100.

The memory 204 may be used to store any number of functional components that are executable on the processing unit 202, as well as data including content items. Thus, the memory 204 may store an operating system 206 comprising a kernel 208. Kernel 208 may be coupled to a WAN daemon ("WAND") 210 configured to monitor and maintain a wide area networking connection. WAND 210 may interrogate peripherals on the bus at a pre-determined interrogation interval. Kernel 208 may also be coupled to one or more device drivers 212. These device drivers 212 may include a USB option driver 212(1) and a USB host controller driver ("HCD") 212(2). Device drivers 212 are coupled to peripherals 214. Several of the illustrative peripherals and components in electronic device 100 are described next.

An image processing unit 216 is shown coupled to a display 218. For example, this may be display 108 on eBook reader device 106(1) described above. In some implementations multiple displays may be present and coupled to image processing unit 216.

Electronic device 100 may have a keypad 220. For example, this may be keypad 114 on eBook reader device 106(1) described above having user actuable controls. Also shown is hard drive 222, which may either use magnetic or optical memory on spinning disks or solid state storage.

An External Memory Interface ("EMI") 224, which comprises components including an EMI clock 226. EMI 224 may be coupled to external memory 228, which may comprise Static Random Access Memory ("SRAM"), Pseudo-static Random Access Memory ("PSRAM"), Synchronous Dynamic Random Access Memory ("SDRAM"), Double Data Rate SDRAM ("DDR"), NAND Flash, and so forth.

Shown is a USB controller peripheral 230 having several components including a USB DMA clock 232, USB phase-locked loop ("PLL") 234, and USB port 236. USB port 236 may be coupled to USB peripherals such as WWAN modem 238. The USB controller 230 may comply with any of the USB standards including USB 1.0, 1.1, 2.0, 3.0 as set forth by the USB Implementers Forum.

Other peripherals may be present in the electronic device 100. These other devices may include a firewire bus, camera, global positioning system, Bluetooth™ wireless interface, PC Card component, and so forth.

Couplings, such as that between kernel 208, device drivers 212 and WAN daemon 210 are shown for emphasis. All devices in FIG. 2 are coupled, with their respective arrows omitted only for clarity of illustration.

Illustrative Processes for Entering USB Reduced Power Mode and USB Low Power Idle Mode FIGS. 3-8 illustrate example processes 300, 400, 500, 600, 700, and 800 that may be implemented by the architecture described above with respect to FIGS. 1 and 2, or by other architectures. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. For ease of discussion, but not by way of limitation, the following figures include references to functions, commands, and/or other elements found in the Linux® operating system. It is understood that the following processes may be implemented on other operating systems as well.

Figure 3:
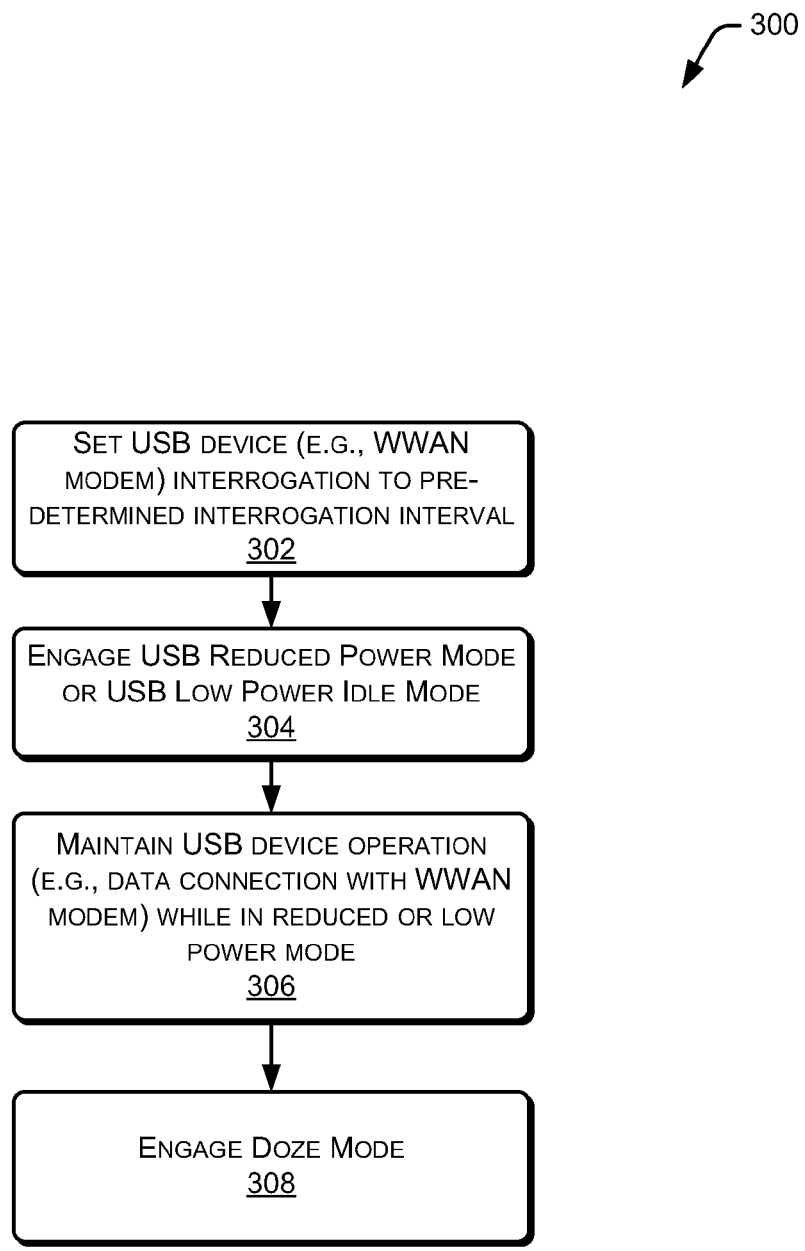
FIG. 3 is an illustrative flow diagram of a process for entering the USB reduced power mode or USB low power idle mode.

FIG. 3 is an illustrative flow diagram 300 of a process for entering the USB reduced power mode or USB low power idle mode. At 302, interrogation of peripherals attached to the universal serial bus may be set to take place at a pre-determined interrogation interval. For example, the WAND 208 may be configured to set an interrogation interval, such as the "signal strength timeout" interval to about 40 seconds. This interrogation interval reduces the rate of USB interrupts from about 20 per second to less than 1 per second, allowing the universal serial bus and the USB host controller 230 to be suspended for longer durations. These longer suspension durations result in power savings. In other implementations, the interrogation interval may be static or dynamically adjusted.

At 304, a USB reduced power mode 102 or USB low power idle mode 104 may be engaged by the device 100. In brief, when the universal serial bus is determined to be idle, various operations and components may be deallocated, killed, halted, gated, or otherwise switched into a lower power state, while allowing attached USB peripherals to retain state information and some functionality. While in these modes, power usage is reduced compared to that consumed while in an active state. Several implementations of USB reduced power modes are discussed below with regards to FIGS. 4-6 while one implementation of a USB low power idle mode is discussed below with regards to FIGS. 7-8.

At 306, in some implementations even while in the USB reduced power mode or the USB low power idle mode, a designated USB peripheral may remain operational, albeit in an altered state. For example, a USB attached peripheral such as WWAN modem 238 may retain a network connection, and may awaken itself and, as called for, the entire electronic device 100 upon receipt of traffic from the network. At 308, the electronic device 100 may enter a doze mode, further reducing power consumption.

Figure 4:
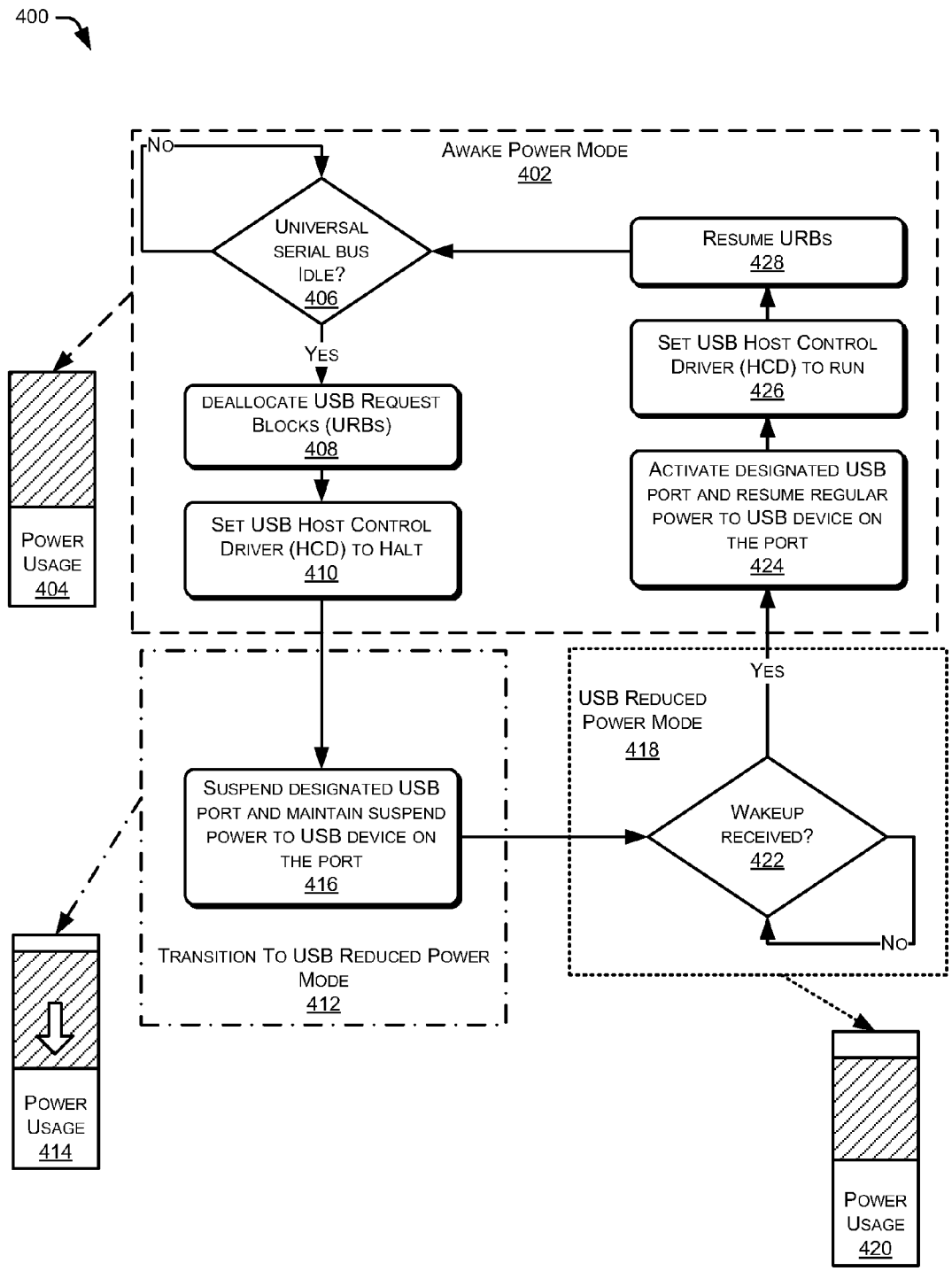
FIG. 4 is an illustrative flow diagram of a process for entering one implementation of a USB reduced power mode.

FIG. 4 is an illustrative flow diagram of a process 400 for entering one implementation of a USB reduced power mode. At 402, the electronic device 100 is in an awake power mode as indicated with a dashed line. While in awake power mode 402, power usage is shown by graph 404 at 100%.

While in awake power mode 402, at 406, the universal serial bus is checked to determine when the bus is idle. In one implementation, the bus is determined to be idle when no traffic has passed for a pre-determined idle check interval. For example, in one implementation, the USB host controller driver 212(2) may comprise an enhanced host controller interface host control driver (EHCI-HCD) which checks for bus activity via a work queue. A work queue allows a device driver 212 to delay processing while interrupts are disabled. Where the OS 206 is Linux®, this may be the schedule_delayed_workqueue managed by the kernel 208. In other implementations, other interfaces may be used such as an open host controller interface (OHCI), Universal Host Controller Interface (UHCI), wireless host controller interface (WHCI), and so forth. In one implementation, this pre-determined idle check interval may be set to at least about 500 milliseconds and at most about 31 seconds, with good performance at about three seconds. In some implementations, the checking at 406 to determine if the universal serial bus is idle may loop until the idle condition is present.

At 408, when an idle condition is determined (i.e., the "Yes" branch from 406), USB request blocks (URBs) are deallocated or otherwise cleaned out. In some implementations, URBs may be deallocated by way of a "kill" command. Killing results in the termination of a process currently executing on the processor 202, in contrast to a halt, terminate, stop, or exit. However, in some implementations URBs may be halted, terminated, stopped, and so forth. URBs include information used for USB transactions and the delivery of data and status between a USB attached peripheral and the host control driver. Execution of an URB is an asynchronous operation. For example, the Linux® usb_submit_urb (urb) call returns substantially immediately after successfully queuing a requested action. Each URB has a completion handler, which is called after the action has been successfully completed or canceled. This completion handler may reside within kernel 208 or device driver 212. The URB also may contain a context-pointer for passing information to the completion handler.

Each peripheral on a USB has an endpoint, which logically supports a queue of requests. This queue is available to be filled so the USB hardware may still transfer data to one endpoint while a driver handles completion of another endpoint. This helps in maximizing use of USB bandwidth. The option driver 212(1) may allocate the URBs for incoming, outgoing, or control information. Each URB includes an endpoint which is used to designate communication with a particular peripheral on the USB. For example, where the OS 206 is Linux® based, this endpoint information is designated "endPointAddress." Entry to a reduced power mode or low power idle mode as well as resumption to an awake power mode is facilitated when the endPointAddress does not change during the transitions between modes. For example, changes to an endPointAddress may result in a usb_submit_urb( ) failure in device driver 212, indicating a USB peripheral has an error or has been unplugged from the USB.

Deallocating the URBs at 408 stops transmission on the USB. For example, URBs may be canceled synchronously with a call to usb_kill_urb( ) in the device driver 212. This provides the functions of usb_unlink_urb( ) while also waiting until after the URB has been returned and a completion handler has finished. Also, the URB in question may also be marked as temporarily unusable, which results in other calls to use the USB receiving an error. Thus, deallocating the URBs idles the USB bus and prepares it for entry into lower power modes. However, deallocating an URB does not disturb the endPointAddress. Thus, upon awakening the endpoints associated with attached peripherals may be addressed just as they were before entry into a lower power mode. Furthermore, because the endpoints have remained constant, state information may also be retained and used to resume.

In some implementations, the USB peripherals are hardwired to the USB host controller, such as a WWAN modem wired to a USB on a circuit board. In these implementations, the assumption that the device endPointAddress will remain static is safely made. Thus, for a device such as a WWAN modem where it is desirable to retain connectivity to the network during a lower power mode, deallocating the URBs will not require a re-enumeration of the device on the bus upon awakening.

At 410, the USB host controller driver ("HCD") 212(2) may be halted as no traffic is present on the USB. In some implementations, the halt may be implemented by changing a state of the HCD 212(2) to "HALT." Halting a HCD 212(2) results in the HCD 212(2) no longer processing additional requests or functions.

The transition from the awake power mode 402 to a USB reduced power mode is indicated by traversing to the dash-dot line box at 412. During this transition 412, power usage is shown by graph 414 as reduced from the 100% level of awake power mode 402.

At 416, one or more designated USB ports may be suspended, and configured to provide suspend power to a USB peripheral on the designated port or ports. In some implementations, a port may be suspended by setting the PORT_SUSPEND bit in the PORTSC register. The suspend power may be initiated by enabling port enable (PORT_PE) and port power (PORT_PP). Depending upon the configuration of the USB peripheral, the transition from full operational power to suspend power may trigger a power saving mode in that peripheral, further reducing power consumption. In some implementations, a watchdog timer, may also be turned off. For example, within the Linux® OS the watchdog timer designated "EHCI_WATCHDOG" may be turned off.

Following transition 412, a USB reduced power mode 418 is obtained, as represented by the dotted box. As described above, the USB HCD has been halted and designated USB ports have been suspended and the devices attached thereto set to suspend power. While in the USB reduced power mode 418, power usage is shown by graph 420 to be less than that of awake power mode 402.

At 422, during the USB reduced power mode 418, the electronic device 100 may wait for a wakeup. This wakeup may be provided by a user input, receipt of data from a USB attached WWAN modem, timer, and so forth. After receiving a wakeup event, the electronic device 100 may transition back to the awake power mode 402.

At 424, the designated USB port may be activated and regular power resumed to the USB peripheral on the port. At 426, the USB HCD may be set to resume operation and run, while at 428, the URBs resume. Now, in the awake power mode 402, the electronic device 100 may resume at 406 to wait for the USB to become idle and transition 412 again into a reduced power mode 418.

Accordingly, the process 400 saves power by transitioning the USB into a reduced power mode when the USB is idle. When a wakeup is received, the device may quickly resume operation.

Figure 5:
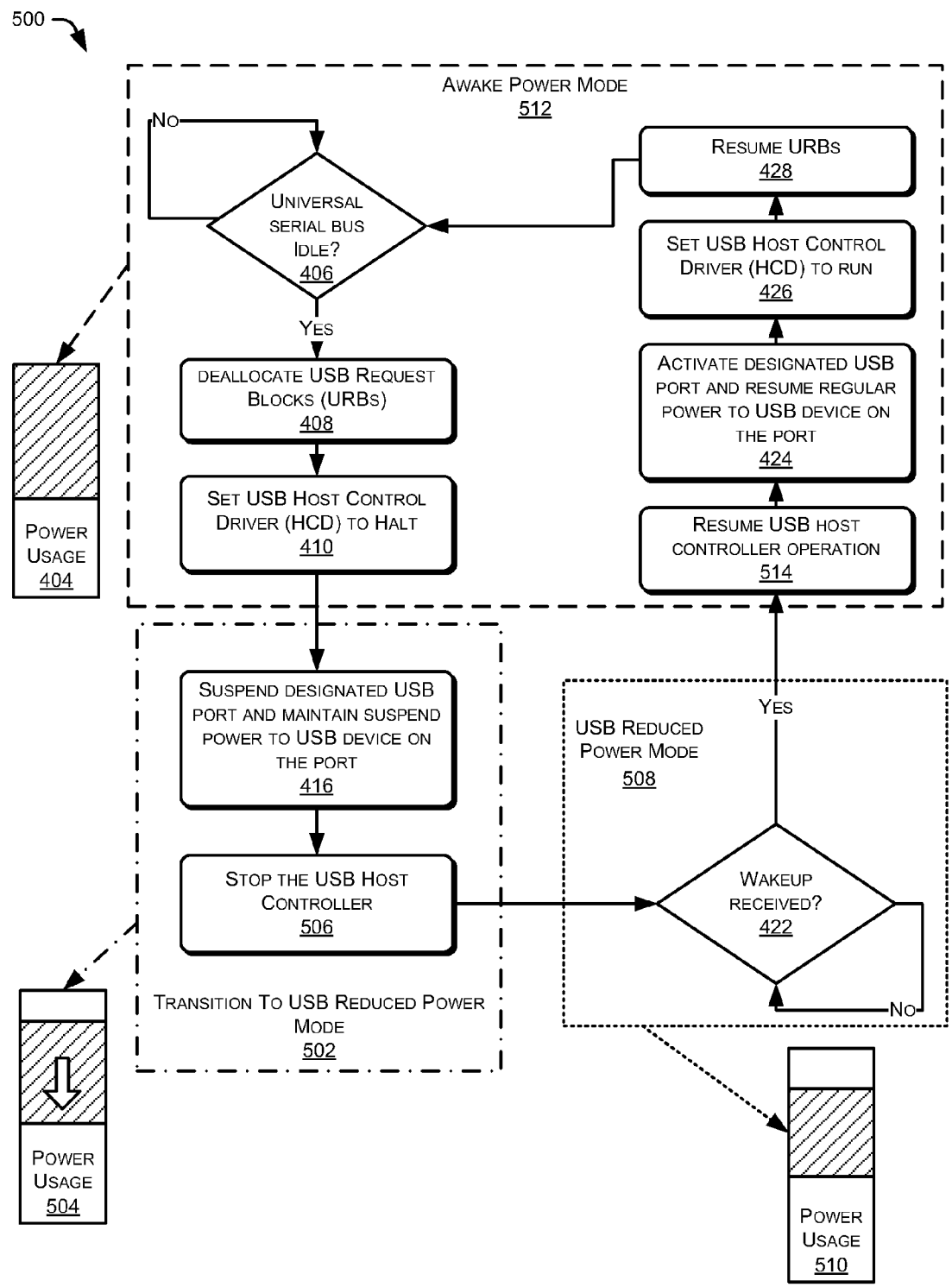
FIG. 5 is an illustrative flow diagram of a process for entering another implementation of a USB reduced power mode.

FIG. 5 is an illustrative flow diagram of another process 500 for entering another implementation of a USB reduced power mode. The process 500 is similar to the process 400 in several respects, but modified in certain aspects as will be described now. In this process 500, the transition 502 to a USB reduced power mode has been amended, resulting in an increased reduction in power usage as charted at 504. In this implementation, after one or more designated USB ports are suspended and configured to provide suspend power to a USB peripheral on the designated port or ports at 416, at 506 the USB host controller may be stopped. Stopping this host controller may include gating the host controller and its associated devices. This stop may be accomplished in some implementations by setting the RUN_STOP bit in USBCMD to 0. In some implementations, the host controller may retain its state while stopped.

At 508, electronic device 100 is in a USB reduced power mode with a power usage as indicated in chart 510 of less than that of shown at 404 during awake power mode. This power saving is realized because, once stopped, the host controller consumes less power.

As above, electronic device 100 may wait at 422 for a wakeup. Once a wakeup has been received, the awake power mode 402 is amended as shown at awake power mode 512 to include at 514 resumption of USB host controller operation.

Figure 6:
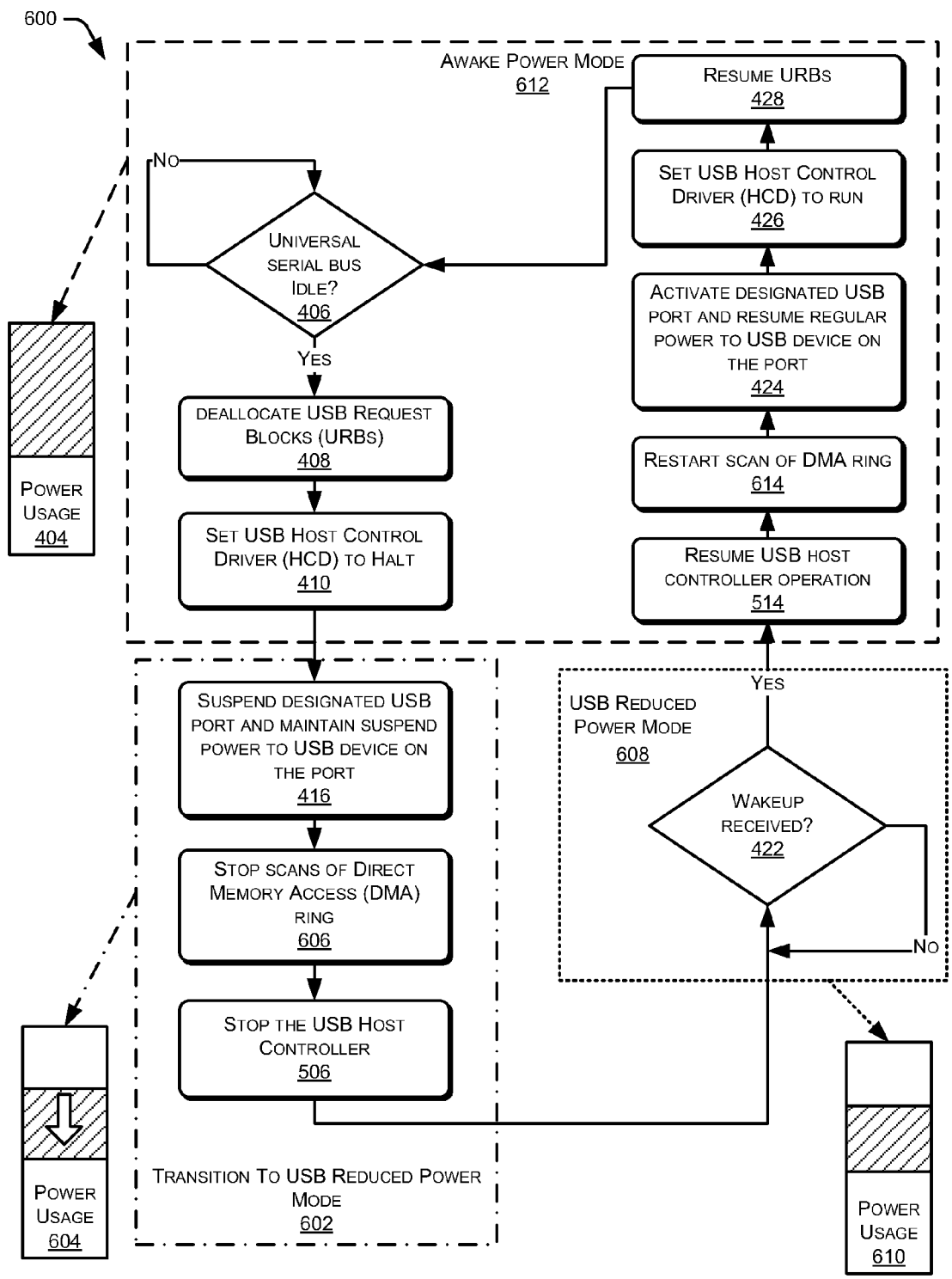
FIG. 6 is an illustrative flow diagram of a process for entering yet another implementation of a USB reduced power mode.

FIG. 6 is an illustrative flow diagram of another process 600 for entering another implementation of a USB reduced power mode. The process 600 is similar to the process 500 in several respects, but modified in certain aspects as will be described now. In this process, the transition 602 to a USB reduced power mode has been amended, resulting in an increased reduction in power usage as charted at 604. At 606, scans of a direct memory access ("DMA") ring are stopped before stopping the USB host controller at 506. Stopping the scans of the DMA ring results in the cessation of interrupts being generated by the scan. With no interrupts keeping the electronic device 100 busy, the electronic device 100 may enter a reduced power mode including placing the processor into a doze mode.

As a result, at 608 the electronic device 100 is in a USB reduced power mode which shows a reduced power usage 610. Because the DMA ring has been stopped, after starting to enter awake power mode 612, at 614 the scan of the DMA ring is restarted after resumption of the USB host controller operation at 514.

Figure 7:
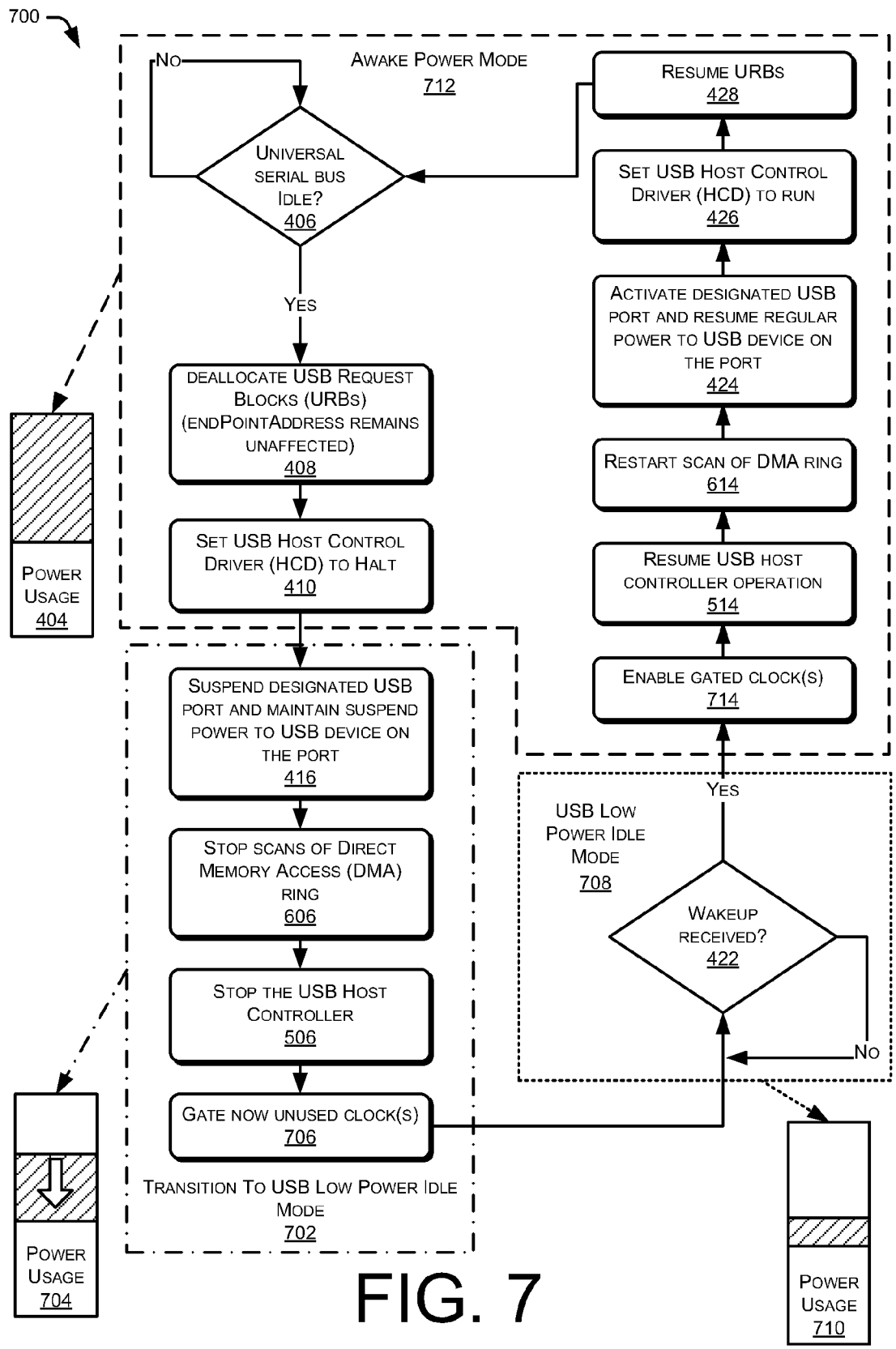
FIG. 7 is an illustrative flow diagram of a process for entering a USB low power idle mode.

FIG. 7 is an illustrative flow diagram of a process 700 for entering a USB low power idle mode. In this process 700, additional power savings are achieved by gating various clocks. Accordingly, the USB reduced power mode of FIG. 6 is amended to recite a USB low power idle mode. The power savings is significant, as will be described.

At 702, the electronic device is transitioning from awake power mode to the USB low power idle mode. During this transition power usage as shown at 704 begins to drop. At 706, the process of FIG. 6 is amended by gating now unused clocks after the USB host controller has been stopped at 506. This gating becomes possible because several peripherals and components are not currently in use. A description of which components, such as clocks, may be gated and the various permutations of gating, is described below with regards to FIG. 8.

At 708, the electronic device 100 is in the USB low power idle mode, and awaits a wakeup. As shown at 710, the power usage is significantly reduced from that shown at 404 during awake power mode 712. For example, testing has indicated that during awake power mode 712, an exemplary eBook reader device 106(1) consumed approximately 100 milliamperes (mA) of current. However, upon entry into the USB low power idle mode 708, power consumption is reduced to about 21 mA.

Implementing the processes described in this application removes from consideration several interrupts and clocking requirements which may otherwise prevent electronic device 100 from entering a lower power doze mode more frequently. As a result, not only is current saved during entry into the USB reduced power and USB low power idle modes, but the remaining components and peripherals within electronic device 100 are provided with more opportunity to enter lower power modes. Thus, power consumption is further reduced.

Upon receiving a wakeup, the awake power mode 612 described in FIG. 6 is amended as shown at 712 to include at 714 enabling the gated clocks before resuming USB host controller operation at 514. Resumption times may be short and virtually unnoticeable to a user of electronic device 100. For example, during testing on an exemplary eBook reader device 106(1), resumption from USB low power idle mode 708 to awake power mode 712 was measured at about 50 milliseconds (ms). Again, because the state was maintained on the designated USB peripherals, and the endPointAddress remains the same upon resumption, services to and from those designated devices may quickly resume.

For example, where the designated USB peripheral is a WWAN modem, the modem may maintain a network connection such as a point-to-point protocol ("PPP") connection even while the electronic device is in USB low power idle mode 708, yet still quickly resume operations when data transfer is called upon. Thus, substantial power savings are realized by allowing the device to spend more time in lower power modes without the drawback of requiring a user to wait for the device to awaken, re-establish a network connection, and begin data transfer.

Components including clocks such as EMI clock 226, USB DMA clock 232, USB PLL 234, and so forth within the electronic device 100 may be significant consumers of power when operating. Clocks may be used to synchronize various signals and actions of the processor 202 and peripherals 214. Depending upon the architecture of the system, clocks may be required for operation.

As described above with respect to FIG. 7, one or more clocks may be gated to reduce power consumption. Because a given electronic device 100 may contain a plurality of clocks, different combinations of clocks may be gated. However, some care must be taken in selecting a clock to gate, as particular clocks may be dependent upon other clocks to function properly.

FIGS. 8A-8D are illustrative flow diagrams of processes and permutations for gating clocks when entering the USB low power idle mode 708. These are exemplary, and it is recognized that variations in architecture of the electronic device 100 may lead to the addition or removal of some clocks. Furthermore, as described above, the sequence of gating may vary upon addition or removal in accordance with the dependencies between the clocks as determined by a given architecture.

FIG. 8A illustrates the gating of now unused clocks 706 where at 802 a USB host controller DMA clock 232 is gated. For example, where electronic device 100 is based on the i.MX architecture, a USB_AHB_CLK clock may be gated.

FIG. 8B illustrates the gating of now unused clocks 706 where at 802 the USB host controller DMA clock 232 is gated followed by at 804 gating an EMI clock 226. For example, in the i.MX architecture, the EMI clock 226 is referred to as the EMI_CLK.

FIG. 8C illustrates the gating of now unused clocks 706 and includes gating the USB host controller DMA clock 232 at 802, gating the EMI clock 226 at 804, and at 806 gating a USB phase-locked loop ("PLL") 234. In some implementations the USB PLL 234 may comprise the USB_PLL.

Finally, FIG. 8D illustrates the gating of the unused clocks 706 as comprising at 802 gating the USB host controller DMA clock 232 followed by at 806 gating the USB PLL 234. As illustrated in FIGS. 8A-8D, variations on what clocks are gated is possible. Which clocks to gate may be determined by various factors including time for a given clock to resume operation, power demands of the clock while operating, power demands from resumption of the clock, expected duration of gating times, and so forth. For example, gating a particular clock may only minimally reduce power demands while at the same time requiring an undesirable interval of time to restart. Thus, in such a situation this particular clock may be left active while other clocks are gated.

Source code in the C language for one implementation of a USB low power idle mode 708 follows. This code is provided as an example, not as a limitation.

Example Code 1

```
static void ehci_idle_count(struct work_struct *work)
{
    struct ehci_hcd *ehci=container_of(work, struct ehci_hcd, dwork.work);
    unsigned long temp;
    if (atomic_read(&ehci_irq_last_count) !=atomic_read
        (&ehci_irq_current_count))     {temp=atomic_read
        (&ehci_irq_current_count);
        atomic_set(&ehci_irq_last_count, temp);
        schedule_delayed_work(&ehci->dwork, msecs_to_jif-
            fies(EHCI_ACTIVITY_MONITOR_THRESH-
            OLD));
    }
```

```
else {
    if (atomic_read(&recalc_work)==0) {ehci_low_
        power_enter(ehci);
        kick_off_delayed_work=0;
    }
    else {
        atomic_set (&recalc_work, 0);
        schedule_delayed_work(&ehci->dwork,    msecs_
            to_jiffies(EHCI_LOW_POWER_THRESH-
            OLD));
    }
}
}
/* Here are the time thresholds: */
#define  EHCI_IDLE_BUS_THRESHOLD  3000/* Bus
IDLE threshold */
#define    EHCI_ACTIVITY_MONITOR_THRESHOLD
500/* Monitor interrupt every 1 second */
#define    EHCI_LOW_POWER_THRESHOLD    1500/*
Ready to enter low power */
/* As can be seen in this implementation, the ehci_irq_last_
count and the ehci_irq_current_count are compared every
500 milliseconds. If they are equal, a 1500 ms workqueue is
scheduled to make sure that no interrupt comes from the
device.*/
```

Example Code 2

```
/* The routine that handles the transition to the low power
mode may:
    a. Save the current USB HOST CONTROLLER structure,
        i.e. ehci structure
    b. Suspend the USB bus
    c. Disable the usb_ahb_clk. */
static void ehci_low_power_enter(struct ehci_hcd *ehci)
{
    if (atomic_read(&suspended)==1) return;
    if (wakeup_value==1) {spin_lock_irq (&ehci->lock);
        atomic_set(&suspended, 1);
        ehci_idle_bus_suspend(ehci to hcd(ehci));
        ehci_low_power=ehci;
        clk_disable (usb_clk);
        suspend_count++;
        spin_unlock_irq (&ehci->lock);
    }
}
```

Example Code 3

```
/* The routine ehci_idle_bus_suspend( ) suspends the USB
bus. It
    d. Finishes handling of any DMA
    e. Suspends the port
    f. Stops the USB controller
    g. Deletes the asynchronous watchdog that deals with the
        DMA */
    /* keep track of which ports we suspend */
    if ((t1 & PORT_PE) && !(t1 & PORT_OWNER) &&
        !(t1 & PORT_SUSPEND)) {
        t2|=PORT_SUSPEND;
        set_bit(port, &ehci->bus_suspended);
    }
    /* enable remote wakeup on all ports */
    if (device_may_wakeup(&hcd->self.root_hub->dev))
        t2|=PORT_WKOC_E|PORT_WKDISC_E|PORT_
            WKCONN_E; else
            t2 &=~(PORT_WKOC_E|PORT_WKDISC_E|PORT_
                WKCONN_E);
    if (t1 !=t2) {ehci_writel(ehci, t2, reg);
    }
    /* turn off now-idle HC */
    del_timer_sync (&ehci->watchdog);
    ehci_halt (ehci);
    hcd->state=_STATE_SUSPENDED;
```

Example Code 3

/* A wakeup may occur either from at least the USB Interrupt
or from higher PPP layer. The wakeup code triggers the exit
from the low power idle mode and enables the usb_ahb_clk.
*/

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method for placing a universal serial bus (USB) into a low power idle mode, the method comprising:
    setting interrogation of a USB wireless wide area networking (WWAN) modem to a pre-determined interval;
    engaging the USB low power idle mode when the universal serial bus is idle, the engaging comprising:
        deallocating a USB request block (URB) while retaining a USB endpoint address of at least the WWAN modem;
        setting a USB host control driver (HCD) to halt;
        suspending a USB port designated to the WWAN modem and maintaining suspend power to the WWAN modem on the USB port;
        stopping a scan of a direct memory access (DMA) ring;
        stopping a USB host controller;
        gating a clock; and
    maintaining a data connection with the WWAN modem while in the USB low power idle mode.

2. The method of claim 1, wherein the clock comprises one or more of a USB host controller clock, an external memory interface clock, or a USB phase-locked loop.

3. The method of claim 1, wherein the clock is gated discretely.

4. A method for transitioning a universal serial bus (USB) from an active mode to a low power mode, the method comprising:
    determining when the universal serial bus is in an idle state;
    upon determining that the universal serial bus is in an idle state,
        deallocating a USB request block (URB) while retaining a USB endpoint address of at least one attached USB peripheral;
        setting a USB host control driver (HCD) to halt;
        suspending a USB port designated to the at least one attached USB peripheral; and
        maintaining suspend power to the at least one attached USB peripheral.

5. The method of claim 4, wherein the deallocating comprises killing a process.

6. The method of claim 4, wherein determining when the universal serial bus is in the idle state comprises checking for activity at a pre-determined idle check interval.

7. The method of claim 6, wherein the pre-determined idle check interval is at least about 500 milliseconds and at most about 31 seconds.

8. The method of claim 4, wherein at least one USB attached peripheral comprises a communication device maintaining connectivity to a network while the universal serial bus is in the low power mode.

9. The method of claim 4, wherein at least one USB attached peripheral comprises a hard drive.

10. The method of claim 8, further comprising transitioning the universal serial bus from low power mode to active mode upon receipt of data from the network via the communication device.

11. The method of claim 4, further comprising setting an interrogation interval of the at least one attached USB peripheral to a pre-determined interrogation interval.

12. The method of claim 11, wherein the pre-determined interrogation interval is at least about twenty seconds and at most about sixty seconds.

13. The method of claim 4, further comprising stopping scans of a direct memory access (DMA) ring.

14. The method of claim 13, further comprising stopping a USB host controller.

15. The method of claim 13, further comprising gating a clock.

16. The method of claim 15, wherein the clock comprises one or more of a USB host controller clock, an external memory interface clock, or a USB phase-locked loop.

17. The method of claim 16, wherein the gating of the USB host controller clock occurs first, the gating of the external memory interface lock occurs second, and the gating of the USB phase-locked loop occurs third.

18. A system for reducing power consumption in an electronic device, the system comprising:
 memory;
 a processor coupled to the memory;
 a universal serial bus (USB) host controller coupled to the processor;
 a peripheral device coupled to the USB host controller:
 a kernel stored in the memory and configured to execute on the processor, the kernel being configured to communicate with a device driver and, when the universal serial bus is idle, to place the universal serial bus into a low power idle mode; and
 the device driver stored in the memory and configured to execute on the processor, the driver configured to communicate with the USB host controller and kernel, at least one of the device driver or the kernel being configured to:
 deallocate USB request block (URB) while retaining a USB endpoint address of at least one attached USB peripheral;
 set a USB host control driver (HCD) to halt;
 suspend a USB port designated to the at least one attached USB peripheral; and
 maintain suspend power to the at least one attached USB peripheral.

19. The system of claim 18, wherein the device driver, the kernel, or both are further configured to:
 stop scans of a direct memory access (DMA) ring;
 stop a USB host controller; and
 gate one or more clocks.

20. The system of claim 19, wherein the one or more clocks comprise a USB host controller clock, an external memory interface clock, or a USB phase-locked loop.

21. The system of claim 19, wherein the electronic device comprises an eBook reader device.

22. One or more non-transitory computer-readable storage media storing instructions that, when executed by one or more processors, cause the one or more processors to perform acts comprising:
 maintaining a pre-determined idle check interval; and
 placing a universal serial bus into a low power mode when the universal serial bus is idle for the pre-determined idle check interval, the placing comprising:
 deallocating a USB request block (URB) while retaining a USB endpoint address of at least one attached USB peripheral;
 setting a USB host control driver (HCD) to halt;
 suspending a USB port designated to the at least one attached USB peripheral; and
 maintaining suspend power to the at least one attached USB peripheral.

23. The one or more non-transitory computer-readable storage media of claim 22, further comprising:
 stopping a scan of a direct memory access (DMA) ring; or
 stopping a USB host controller; or
 gating a clock.

24. The one or more non-transitory computer-readable storage media of claim 22, further comprising, after entry into the low power mode, placing the one or more processors into a doze mode.

* * * * *